(12) United States Patent
Ayats et al.

(10) Patent No.: US 9,327,425 B2
(45) Date of Patent: May 3, 2016

(54) PROCESS FOR MAKING A PELLET

(75) Inventors: Francesc Ayats, Barcelona (ES); Diana Oehms, Ludwigshafen (DE); Pavlinka Roy, Ludwigshafen (DE); Jordi Salvador, Barcelona (ES); Ralf Wiedemann, Ludwigshafen (DE)

(73) Assignee: RECKITT BENCKISER FINISH B.V., Hoofddorp (NL)

( * ) Notice: Subject to any disclaimer, the term of this patent is extended or adjusted under 35 U.S.C. 154(b) by 0 days.

(21) Appl. No.: 12/949,302

(22) Filed: Nov. 18, 2010

(65) Prior Publication Data

US 2011/0062620 A1 Mar. 17, 2011

Related U.S. Application Data

(63) Continuation of application No. 10/595,919, filed as application No. PCT/GB2004/005273 on Dec. 16, 2004, now abandoned.

(30) Foreign Application Priority Data

Dec. 19, 2003 (GB) .................................. 0329529.2

(51) Int. Cl.

| | | |
|---|---|---|
| *B29C 47/00* | (2006.01) | |
| *B29B 9/10* | (2006.01) | |
| *B29B 9/12* | (2006.01) | |
| *C08J 3/12* | (2006.01) | |
| *C08J 3/18* | (2006.01) | |
| *C08K 5/053* | (2006.01) | |
| *B29C 45/00* | (2006.01) | |
| *B29K 29/00* | (2006.01) | |
| *B29L 31/00* | (2006.01) | |

(52) U.S. Cl.
CPC ... *B29B 9/10* (2013.01); *B29B 9/12* (2013.01); *C08J 3/12* (2013.01); *C08J 3/18* (2013.01); *C08K 5/053* (2013.01); *B29C 45/0001* (2013.01); *B29K 2029/04* (2013.01); *B29L 2031/7128* (2013.01); *C08J 2329/04* (2013.01)

(58) Field of Classification Search
CPC ... B29B 9/10; B29C 47/0011; B29K 2029/04
USPC .................................... 264/176.1, 177.2, 211
See application file for complete search history.

(56) References Cited

U.S. PATENT DOCUMENTS

| | | | |
|---|---|---|---|
| 3,519,706 A * | 7/1970 | Pantsios ........................ 264/143 |
| 4,323,492 A * | 4/1982 | Zimmermann et al. ...... 524/388 |
| 5,137,969 A | 8/1992 | Marten et al. |
| 5,462,980 A * | 10/1995 | Bastioli et al. .................. 524/47 |
| 6,009,690 A * | 1/2000 | Rosenberg et al. ............. 53/454 |
| 6,303,553 B1 | 10/2001 | Gorlin |
| 2002/0137652 A1* | 9/2002 | Gressel et al. ................ 510/297 |

FOREIGN PATENT DOCUMENTS

| | | |
|---|---|---|
| DE | 2302871 A1 | 7/1974 |
| DE | 10142922 A1 | 3/2003 |
| EP | 0635545 A2 | 1/1995 |
| GB | 937057 A | 9/1963 |
| WO | 9826911 A1 | 6/1998 |

OTHER PUBLICATIONS

Falbe, J., et al., "Rompp Chemie Lexikon," 1995, pp. 2281-2285. Contains definition(s) of terms used in application specification, submitted by opponent in an opposition against a related EP application.

Falbe, J., et al., "Rompp Chemie Lexikon," 1995, pp. 3578-3579. Contains definition(s) of terms used in application specification, submitted by opponent in an opposition against a related EP application.

Finch, C.A., " Polyvinyl Alcohol; Properties and Applications," 1973, pp. 45.

\* cited by examiner

*Primary Examiner* — James Sanders
(74) *Attorney, Agent, or Firm* — Troutman Sanders LLP; Ryan A. Schneider; Elizabeth-Ann Weeks

(57) ABSTRACT

The invention comprises a shaping process for making pellets of a thermoplastic extrudable resin composition. The resin composition comprises a thermoplastic polymer, plasticizer and optionally further additives. The plasticizer comprises a component which is solid at room temperature. The process is run at a temperature above the melting point of the plasticizer and below the melting/plastification temperature of the thermoplastic polymer.

15 Claims, No Drawings

PROCESS FOR MAKING A PELLET

This is a continuation patent application of U.S. Ser. No. 10/595,919, which was filed as an application filed under 35 USC 371 of PCT/GB2004/005273.

The present invention relates to a process for making pellets of a thermoplastic extrudable polymer.

Processes for making pellets of thermoplastic extrudable polymer are well known in the plastic industry. Typically the pellets are cylindrical and approximately 3 mm in diameter and 3 mm in length. The pellets are used in a wide range of plastic article manufacturing processes.

The pellet manufacturing process generally includes a plastification step. In this step the formulation to be pelletised is melted and fed into a twin screw extruder. This has been seen to be beneficial as the pellets produced have been found to comprise of a homogeneous blend of the pellet components due to effective mixing of all molten components in the extruder.

EP-A-0 415 357 describes the making of pellets comprising polyvinylalcohol (PVOH) by melt extrusion with the extrusion being carried out in the temperature range of 150-195° C.

Pelletising processes having a plastification step have several disadvantages associated therewith. The principle disadvantage is the requirement for heating, which means that the energy consumption of these processes is very high.

Furthermore these 'hot' processes are not suitable for polymers which are heat sensitive (such as PVOH) due to heat induced decomposition. Also these 'hot' processes give a heat history to the polymer which has been found to negatively influence properties of the polymer. In the case of PVOH this has been found to detrimentally affect the PVOH water solubility.

In other pelletising processes dry compaction of the pellet components is carried out at low temperature. Thus the disadvantages of the 'hot' processes are avoided.

WO-A-98/26911 describes a low temperature process for the manufacture of PVOH pellets. In the process the pellets components, in this case a mixture of powdered PVOH and various additives such as plasticisers is fed between two rollers and compressed into pellets. The PVOH component in the pellet blend is not melted in the process and so the issue of heat degradation is avoided.

Also GB-937 057 describes such a low temperature compression process. This follows initial mixing of the plasticiser and PVOH at an elevated temperature.

However, although this process (the cold compression process) eliminates the problem of heat induced decomposition of the polymer, the pellets produced suffer from other disadvantages.

Most of the disadvantages stem from the inherent nature of the compaction process, more specifically the rollers and the powder feed thereto. It has been found to be very difficult to ensure that the powder feed is spread evenly across the rollers. This has the effect that control of the size of the pellets is difficult and so the size of the pellets can vary significantly.

Furthermore significant dust formation is typical for this kind of process. Additionally the pellets are commonly friable having poor integrity and easily form dust from friction rubbing against each other, thus worsening the dust issue. Both of these issues are attributed to the poor spreading and roller compression technique.

Furthermore significant variability of the composition of the pellets and poor homogeneity of the pellets has also been observed. The issues are also believed to be associated with the poor powder distribution over the rollers. The problem of the variability of the pellet composition and the poor homogeneity of the pellets is exacerbated when the pellets are taken and used in a further processing step.

These kinds of pellets, wherein the thermoplastic polymer component of the pellets is PVOH, are used in the manufacture of water soluble PVOH pouches in extrusion/injection moulding processes. The pouches, as an example, are commonly used to contain a detergent composition for use in an automatic washing machine (laundry/dishwasher). In these applications is it vital that the pellets have high homogeneity to ensure that the pouches produced have good integrity to be stable in storage and have the expected water dissolution properties.

Pellets produced in a cold compaction process, as described above, often fail to meet the level of homogeneity required for the processing into the pouch format.

It is an object of the present invention to obviate/mitigate the problems outlined above.

According to the present invention there is provided a shaping process for making pellets of a thermoplastic extrudable resin composition comprising a thermoplastic polymer, plasticiser and optionally further additives, the plasticiser comprising a component which is solid at room temperature, wherein the process is run at a temperature above the melting point of the plasticiser and below the melting/plastification temperature of the thermoplastic polymer.

The shaping process may comprise pressing, extrusion, calendering and/or compaction. Most preferably the shaping process comprises extrusion.

The process of the present invention has been found to overcome the disadvantages associated with the prior art. Firstly as the process is operated at a temperature below the melting/plastification temperature of the thermoplastic polymer the process has been found to be extremely energy efficient. Furthermore the heat degradation of heat sensitive materials in the resin blend is dramatically reduced by the lowered process temperatures.

Additionally as the process operates above the melting point of the plasticiser (which is then allowed to cool to form the solid pellet) the pellets have been found to have a very low friability. Thus the pellets have a much lower tendency to release dust upon friction rubbing.

Furthermore as the pellets are produced at a temperature above the melting point of the plasticiser component the pellets have been found to have excellent homogeneity. More specifically both the overall composition of each pellet and the distribution of the individual components within the pellets have been found to have an high level of predictability and low variance. This is especially important when the pellets are used in a further processing step such as a second extrusion process (e.g. injection moulding) for the manufacture of an article comprising the thermoplastic polymer.

Generally the components are delivered to the shaping equipment used in the process in particulate form.

It has been found that the particle size of the raw materials used to make the pellets should be small. This has been observed to ensure high homogeneity of the pellets. The particle size of the raw materials used preferably is below 2000 μm, more preferably below 1200 μm, more preferably below 400 μm and most preferably about 200 μm.

Preferably the plasticiser is present in the composition with at least 5%, more preferably 10%, most preferably 15%.

Preferably the temperature of the material within the extruder does not exceed a temperature which is 10° C. below the melting/plastification temperature of the thermoplastic polymer at any time. More preferably it does not exceed 15° C., more preferably 30° C. and most preferably 45° C. below the melting/plastification temperature of the thermoplastic polymer. However, it is desired that the temperature of the material exceeds the ambient air temperature. Preferably the temperature of material within the extruder is at least 40° C., more preferably at least 45° C., and most preferably at least 50° C.

The plasticiser has to at least partially melt at the preferred operating temperature. The melting point of the plasticiser component is preferably at least 15° C., preferably at least 30° C. and most preferably at least 45° C. below the melting/plastification temperature of the thermoplastic polymer.

Preferably the plasticiser comprises a carbohydrate.

Carbohydrates are usually represented by the generalised formula $C_x(H_2O)_y$. The term herein also includes materials which are similar in nature like gluconic acids or amino sugars which cannot be fully represented by this formula. Other carbohydrate derivatives like sugar alcohols such as sorbitol, glucitol, mannitol, galactitol, dulcitol, xylitol, erythritol, isomaltutose and isomalt fall within this term.

Most preferred carbohydrates include the more thermally stable carbohydrates such as sorbitol, glucitol, mannitol, galactitol, dulcitol, xylitol, erythritol, isomaltutose and isomalt.

Other preferred plasticiser systems include solid fatty acid alkoxylates, fatty alcohol alkoxylates or polyalkylene glycols (such as long chain polyethylene glycol).

The plasticiser may comprise a further auxiliary component. Preferred auxiliary components include glycerin, ethylene glycol, propylene glycol, diethylene glycol, diproylene glycol, triethanol amine, diethanol amine and methyldiethyl amine.

Once the or each strand has issued from the extruder it may be permitted to cool under ambient conditions. Alternatively cooling may be assisted. One way in which this may be done is by employing a cooled metal belt onto which the or each strand issues. Another way in which this may be done is by using a cooled fluid, preferably cooled air, downstream of the extruder. Another way is by blowing a fluid, preferably air, across the or each strand. One or more of these methods may be used.

Preferably the or each strand is separated into pellets, during the manufacture.

The strands are separated into pellets preferably by cutting. However, other separation methods, for example twisting, are not ruled out. A method may be envisaged whereby the strand is twisted at intervals when still plastic, to form "sausages", which can be separated by breaking the connections, once they have become more brittle. Partial cutting or pressing or nipping or perforating (all such methods collectively called "scoring" herein) to form frangible separation webs, may also be employed, to form tablet precursors. Separation of the precursors to produce pellets may be effected during manufacture or by the consumer, manageable lengths being provided from which the consumer breaks or twists off pellets as required. A pellet precursor may be, for example, a straight row of pellets, to be broken off as needed.

The extrusion pressure may be whatever is required to carry out the process in an efficient manner. Suitably it is in excess of 3 bar (0.3 MPa), preferably in excess of 5 bar (0.5 MPa), and more preferably is preferably in excess of 8 bar (0.8 MPa). More preferably still is preferably in excess of 12 bar (1.2 MPa). Most preferably it is in excess of 40 bar (4 MPa). The extrusion pressure preferably does not exceed 100 bar (10 MPa), more preferably 60 bar (6 MPa).

Generally the pellets are for use in injection moulding processes. The injection moulding process is preferably used for the manufacture of water soluble pouches intended to contain a detergent formulation for use in an automatic washing machine or in an automatic dishwasher. Thus the pellets preferably comprise a water-soluble/water-dispersible thermoplastic polymer.

In this use the advantageous properties of the pellets produced in accordance with the invention, especially the high homogeneity have been found to be particularly beneficial. It is believed that this property is most beneficial as the integrity of the injection moulded product relies upon such high homogeneity of the composition being injection moulded as otherwise the low homogeneity will be reflected in the injection moulded product. The high homogeneity has been found to lead to predictable water solubility of injection moulded products.

Preferably the water-soluble/water-dispersible thermoplastic polymer comprises PVOH or a derivative thereof.

Other water-soluble/water-dispersible polymers may be used in the process either as an alternative or in addition to PVOH. Preferred examples include poly(vinylpyrollidone), poly(acrylic acid), poly(maleic acid), a cellulose derivative (such as a cellulose ether/hydroxypropyl methyl cellulose), poly(glycolide), poly(glycolic acid), poly(lactides), poly(lactic acid) and copolymers thereof.

Processing aids may be present in the admixture which is processed. Preferred processing aids include mono-, di-, tricarboxylic acids/salts thereof, fatty acids such as stearic acid/salts thereof, mono-, di- or triglycerides/salts thereof, aerosil, inorganic and organic pigments.

The invention will now be illustrated with reference to the following non-limiting Examples.

EXAMPLES

Example 1

The pelletising process was conducted on an extruder (twin screw, ICMA S. Giorgio, Milan (dedicated to processing of plastic blends and alloys).

The extruder had the following characteristics.

Screw diameter: 35 mm

Screw length: 40 cm

Working pressure: 30 bar

Output: 5 kg/h.

Temperature zones: 6 (T1=50° C., T2=60° C., T3=T4=90° C., T5=105° C. and T6 (the die)=105° C.)

The extruder was attached to a two-roll unit used as a cooling source and connected to a pellet cutter.

The following formula was fed into the extruder in powder form.

| Material | % |
|---|---|
| PVOH resin | 85.0 |
| Sorbitol | 11.0 |
| Processing aids | 4.0 |
| Total | 100.0 |

The pellets obtained were chilled to room temperature. The formula yielded solid pellets having low friability.

Example 2

The pelletising process was conducted on a pellet press (model V3-75 from Universal Milling Technologies).
The press had the following characteristics.
Die diameter: 350 mm
Holes diameter: 2 mm
Hole length: 3 mm
Infeed cone: 45°
Space between die/rollers: 1.5 mm
Die speed: 5 m/5
Motor: 30 kW
Temperature: 98-102° C.

The following formulae were fed into the extruder in powder form.

| Material | Formula 1 | Formula 2 | Formula 3 |
|---|---|---|---|
| PVOH resin | 81.0 | 87.0 | 85.0 |
| Sorbitol | 15.0 | 11.0 | 11.0 |
| Processing aids | 4.0 | 2.0 | 4.0 |
| Total | 100.0 | 100.0 | 100.0 |

The pellets obtained were chilled to room temperature. Each formula yielded solid pellets having low friability.

The invention claimed is:

1. An extrusion process of making pellets of a thermoplastic extrudable resin composition consisting essentially of a thermoplastic polymer, plasticiser and optionally up to 4 wt % of one or more processing aids, the plasticiser consisting of a component which is solid at room temperature and a further auxiliary component selected from the group consisting of glycerine, ethylene glycol, propylene glycol, diethylene glycol, dipropylene glycol, and methyldiethyl amine, wherein:
the thermoplastic polymer is a water-soluble or water dispersible PVOH or a derivative thereof;
the temperature of the composition within the extruder does not at any time exceed a temperature which is 45° C. below the melting or plastification temperature of the thermoplastic polymer;
the extrusion process comprises extruding the composition into one or more strands, permitting the strands to cool under ambient conditions or with assisted cooling, and separating or partially separating the one or more strands into pellets by a method comprising cutting, twisting, partial cutting, pressing, nipping or perforating; and
the maximum temperature of the extrusion process, including the extrusion of the composition into the one or more strands, is above the melting point of the solid component of the plasticiser and below the melting or plastification temperature of the thermoplastic polymer.

2. A process according to claim 1, wherein the plasticiser comprises at least 5 wt % of the mass of the thermoplastic extrudable resin composition.

3. A process according to claim 2, wherein the plasticiser comprises at least 10 wt % of the mass of the thermoplastic extrudable resin composition.

4. A process according to claim 3, wherein the plasticiser comprises at least 15 wt % of the mass of the thermoplastic extrudable resin composition.

5. A process according to claim 1, wherein the particle size of raw materials used is below 2000 lam.

6. A process of manufacturing an injection molded water soluble pouch containing a detergent formulation, the method comprising the steps of: injection molding a water soluble pouch from pellets of a thermoplastic extrudable resin composition formed by the extrusion process of claim 1.

7. A process according to claim 1, wherein the one or more processing aids are selected from: mono-, di-, tri-carboxylic acids/salts thereof, fatty acids, mono-, di-, and tri glycerides/salts thereof, aerosol, inorganic pigments and organic pigments.

8. A process according to claim 1, wherein the temperature of the extrudable resin composition within the extruder is at least 40° C.

9. A process according to claim 1, wherein the temperature of the extrudable resin composition within the extruder is at least 50° C.

10. A process according to claim 6, wherein the detergent formulation is an automatic washing machine detergent composition or an automatic dishwasher detergent composition.

11. A process according to claim 1, wherein the at least one further auxiliary component comprises propylene glycol.

12. A process according to claim 1 wherein the strand or strands are separated by cutting or twisting the strand.

13. A process according to claim 1 wherein the strand or strands are partially separated by partial cutting, pressing, nipping or perforating.

14. A process according to claim 12 comprising twisting the strand at intervals when the strand is still plastic in order to form "sausages".

15. A process according to claim 14 wherein the "sausages" are separated by breaking the connections between the "sausages" once they have become more brittle.

* * * * *